Patented Sept. 16, 1947

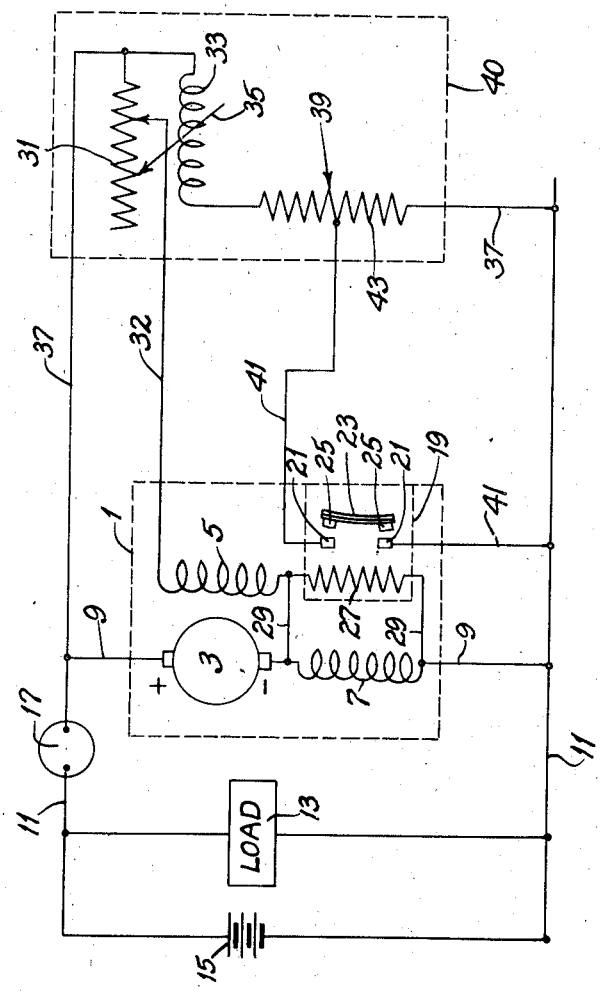

2,427,440

UNITED STATES PATENT OFFICE 2,427,440

GENERATOR PROTECTOR

Lewis W. Buell, Rehoboth, Mass., assignor to Metals & Controls Corporation, Attleboro, Mass., a corporation of Massachusetts Application June 17, 1943, Serial No. 491,167

2 Claims. (Cl. 171—223)

This invention relates to generator protectors, and with regard to certain more specific features, to thermostatic controls for compound-wound automotive and other generators.

Among the several objects of the invention may be noted the provision of means for protecting a generator against overheating caused by a wide variety of circumstances, as for example, (1) a heavily loaded work circuit, (2) a discharged storage battery, (3) a lack of proper ambient cooling, (4) an unbalanced loading when connected in parallel, etc.; the provision of apparatus of the class described which avoids or delays the necessity for disconnecting the generator from the line and rendering it useless during protective operation; and the provision of apparatus of the class described which is simple in form, reliable in operation and economical to produce. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, on which is illustrated one of various possible embodiments of the invention, the single figure is a wiring diagram illustrating the generator protector of the invention.

In the following description airplane generators will be referred to for purposes of example, but it is to be understood that the invention is also applicable to other generators.

Ordinarily a 24 volt storage battery is used for supplying electrical loads on airplanes. Any voltage above that will serve to force a charge into the battery. Ordinarily the voltage regulator used is set at 28½ volts. As a battery discharges the voltage it supplies drops and concurrently the load on the generator increases, due to the increased voltage drop.

Where a battery is at a low charge, the charging current at 28½ volts is relatively high and some plane designers feel that this is the largest single cause of generator failures on single-engined planes.

At the start of an airplane run when a battery is down, and particularly if there are some extra load requirements, a generator rated at 100 amperes may need to supply 200 amperes (100% overload). This of course brings about abnormal heating which may become destructive. If the rate of generator cooling equals the heating rate there is no difficulty, but many times the heating rate is so much higher than the cooling rate, due perhaps to faulty cooling conditions, that a burn-out occurs. This renders the generator useless and it is then only a matter of time until the battery is run down to such a point that the entire power plant of the airplane is out of commission.

Generators are in general provided with cooling systems for abstracting as much heat as possible so as to forestall burn-out. This is done by wind-scoops, fans, blowers, and the like. However, it often occurs, particularly in military airplanes, that such cooling equipment is put out of commission. For example, a wind-scoop may become ice bound, jammed by a bird, or become bullet riddled, thus making it useless, or at least reducing its efficiency. Under such conditions the generator affected will tend to overheat on a smaller overload than otherwise, or overheat without overload.

Also, one of the main causes for overloading of parallel-connected generators on multi-engined airplanes is maladjustment of the voltage regulators. For example, in a four-generator system, a generator, adjusted to operate at approximately one and one-half volts higher than others in the system, will function to carry about twice its normal share of the load. This overloading causes overheating of the affected generator. In addition, the ordinary voltage regulator is a delicate instrument requiring minute adjustment and thus the unbalanced condition is not uncommon.

Any solution to the above problem which takes the affected generator off the line is sometimes little better than permitting the generator to burn out. It only saves the generator which is not always of most importance. It is better to keep the generator operating at some fractional load on the line until the condition causing the trouble can be reached for elimination. By means of the present invention, the generator is not only safe from a burn-out, and, at least not immediately, it is not disconnected from the line; and it is permitted partially to perform and function under the emergency conditions. This is accomplished by reducing the voltage at which the generator serves its load, thus substantially reducing its heating rate. Then when the difficulty causing the heating is removed, such as elimination of the cooling trouble, or the gradual (if not prompt) charging of the run-down battery, or reduction in load, the voltage is again stepped up for normal operation.

Referring now more particularly to the drawing, numeral 1 indicates a generator organization having an armature 3, a shunt field 5 and a series field 7. The generator leads 9 are connected to a load circuit 11 supplying a load 13 and a battery 15. A reverse-current relay is shown in the load circuit 11 at 17. The battery 15 supplies the load 13 in the absence of the operation of the generator 1. If the battery is fully charged, the generator current is low or nil. But if the battery is down in voltage it receives charging current from the generator and the generator assumes the load 13, in addition to the charging load.

A thermostat assembly 19 is placed in the ambient temperature medium of the generator, as for example, by attaching the assembly to the generator case or by otherwise subjecting it to the temperature engendered by the heat from the generator. In the assembly 19 are contacts 21. These are opened and closed by a thermostatic switch member 23 which carries contacts 25 cooperating with said contacts 21. The thermostatic element 23 per se may be of various types, such as the well-known Spencer snap-acting bimetallic discs carrying the contacts 25. The bimetallic components are so arranged that at normal cool temperatures the contacts 21, 25 are open as shown, but upon abnormal heating to a predetermined temperature, the thermostatic member 23 closes the contacts 21, 25. Upon cooling these contacts automatically reopen.

At numeral 27 is shown a resistance heater element in heating relationship (ordinarily near) to the thermostatic element 23. Heater 27, as shown at 29, is connected in parallel with the field coil 7. Hence the heater is not required to carry all of the current output of the generator. However, the heater 27 is so designed in conjunction with the thermostatic element 23 that, before the generator output approaches a burn-out value, the heat from the generator and from the heater 27 causes the thermostatic element 23 to snap from its cold position shown in the drawing to its hot position which closes the contacts 21, 25.

Additional elements are shown in a box 40 and are constituted by a variable field rheostat 31 which is connected into the shunt field 5 as indicated by the line 32. This field rheostat 31 is under automatic control of a magnetic control coil 33 as indicated by the control arm 35. The details of the organization of the magnetic coil 33, control arm 35 and adjustable rheostat 31 needs no further description since those skilled in the art are familiar with such arrangements per se for other uses.

Connected in series with the magnetic control coil 33 is a swamping resistance 39. Thus it will be seen that the generator feeds the swamping resistance 39 and the magnetic coil 33 in series, and that when the thermostatic element 23 is in its open, cold position all of the resistance 39 is connected (see circuit lines 37).

The purpose of the thermostatic element 23 is to cut out some of the resistance 39 which is accomplished by a lead 41 running through the contacts 21 to an intermediate point on said resistance 39.

Operation is as follows:

As long as the battery 15 is not too far discharged and the load 13 is not too great, the generator 1 operates cool enough so that the thermostatic element 23 remains in its cold (open-circuit) position shown in the drawing. The generator will then be operated, say at 28½ volts, producing a certain current in the magnetic coil 33 and maintaining the setting of the field rheostat 31 as shown.

Suppose now that the generator overheats, due for example to a clogged air scoop. This will cause temperature rise, and, since the thermostatic member 23 is subjected to generator overheating, it will at a predetermined point snap to its hot position, closing the contacts 21 and 25. This will shunt out a section 43 of the resistance 39. With resistance 39 thus reduced, more current will flow in the magnetic control coil 33, thus resetting the field rheostat 31 to introduce more resistance into the circuit of the shunt field coil 5. The generator will therefore have its output voltage predeterminately reduced and will therefore assume less load under new conditions of stability. I have found that a satisfactory reduced voltage is the stated 24½, which is approximately the same as a terminal voltage of a partially discharged battery. The amount of resistance 43 cut out is predetermined to accomplish this. The result is that a substantial part of the battery charging load will immediately be taken off the generator.

All straight resistive loads will be reduced directly in proportion to the drop in generator voltage. Most aircraft motors will draw less current with a drop in supply voltage, although there are certain types of motors where the current increases. However, the general effect of reducing the generator output voltage by the above-mentioned amount is to decrease the generator output. Tests on representative airplane loads show that by dropping the generator output voltage from 28½ volts to 24 volts, the load on the generator is reduced approximately 36%, including both resistance and motor loads. Of course the actual amount that the generator output is reduced is dependent upon the particular installation, that is, the types of loads, battery conditions at the instant of protector operation, and other factors. The general rule however is about as stated.

Assume next that, instead of the generator overheating due to an impaired cooling system, the situation is as follows:

An airplane has been grounded in an isolated location and the crew has used the radio equipment excessively, thus running down the battery 15. Then, when the next flight is started, the low voltage of the battery will bring about an excessive charging current from the generator 1, and in addition the load 13 may be heavy at the same time. The generator 1 will, of course, tend to supply the load under electrical overload conditions on the generator, such as may again cause overheating. The resistance heater coil 27 will then go into operation to heat the thermostatic element 23. This closes the contacts 21, 25, again short-circuiting the section 43 of the resistance 39 and causing the magnetic coil 33 to insert more of the resistance 31 into the circuit of the shunt field 5. This again reduces the generator voltage to 24½ volts. While the battery 15 will then be charged at a slower rate, the generator is operating to some extent as well as being saved. In other words, 24½ volts being not so much over the terminal voltage of a partially discharged battery, the battery charging load is immediately reduced.

If the battery 15 is at or near full charge and the cause of overloading of the generator is the load 13, then the battery will furnish some of the load until its peak voltage has been drained off to a point equal to the generator voltage.

It will be recognized that the invention does not provide 100% protection because, under certain conditions, it is still possible for the generator to tend to burn out, as for example, where the generator may be so heavily overloaded or short-circuited that a reduction in its output voltage will not reduce the generator output sufficiently to save the machine from destroying itself. If desired any of the known thermostatic cutouts may additionally be used to take the generator entirely off the line upon continued increased heating after operation of 23. In this event the additional cutout is set to operate at a temperature above that of 23 but below the burn out temperature of the generator. However, without the additional cutout, the invention will protect the larger percentage of airplane, automobile and small-boat generators under the practical conditions at which they operate. In addition, the invention is an improvement upon the old scheme of complete generator protection brought about merely by arranging the protector to take the generator off the line because the electrical system is made of some use even if at lower capacity. Then when a given emergency is over, the generator is still available to do its ordinary work.

The invention is quite useful on generators on multi-engined planes, in which case a plurality of generators protected as above described are connected in parallel across a load circuit, as will be readily understood.

It should be understood that if it is desired to have the invention operate in response to electrical overload only, as distinguished from response to mere heating of the generator caused by defective cooling systems and the like, then the thermostatic assembly 19 may be located at a point other than in the ambient heated atmosphere of the generator, that is, at some distance from the generator.

While the present disclosure shows the current in heater 27 limited by shunt field 5, it should be understood that all of the current may be sent through the heater, or any fixed ratio of the total current by suitable shunt or similar arrangements.

The invention is also operative on alternators, either by sending the whole alternator output through the heater, or by means of a current transformer supply current to the heater.

Broadly the thermostatic switch 19 is used herein to cause the voltage regulator parts 40 to reduce voltage or to regulate at a reduced voltage rate.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. In apparatus of the class described, a compound-wound generator, a variable resistor in series with the shunt field of said generator, a magnetic control coil for controlling said resistor and adapted to increase its resistance upon increase of current flow in the coil, said coil being connected in series with a fixed resistance across the armature circuit of said generator, a heater responsive to current in the armature circuit of said generator, a heat-responsive switch located to be heated by said heater and also by said generator, said switch being connected in a circuit adapted to shunt out a part of said fixed resistance when the temperature of the switch rises above a predetermined value, thereby to increase current flow in said coil, and increase the resistance of said resistor to reduce the output of said generator upon overheating due to overload or to improper cooling.

2. In apparatus of the class described, a compound-wound generator, a variable resistor in series with the shunt field of said generator, a magnetic control coil for controlling said resistor and adapted to increase its resistance upon increase of current flow in the coil, said coil being connected in series with a fixed resistance across the armature circuit of said generator, an electrical resistance heating element connected in parallel with the series field of said generator, a snap-acting thermostatic switch located to be heated by said heater and also by said generator and adapted to snap from a normally open to a closed position when its temperature rises above a substantially predetermined value, said switch being connected in a circuit adapted to shunt out a part of said fixed resistance when the switch is closed, thereby to increase current flow in said coil, and increase the resistance of said resistor to reduce the output of said generator upon overheating due to overload or to improper cooling.

LEWIS W. BUELL.

REFERENCES CITED

The following references are of record in the file of this patent:

UNITED STATES PATENTS

| Number | Name | Date |
|---|---|---|
| 2,367,933 | Ely | Jan. 23, 1945 |
| 1,622,282 | Hulse | Mar. 29, 1927 |
| 1,400,501 | Conklin | Dec. 13, 1921 |
| 1,976,404 | Leingang | Oct. 9, 1934 |
| 2,244,307 | Menzel | June 3, 1941 |
| 1,306,894 | Hanker | June 17, 1919 |
| 1,260,649 | Conrad | Mar. 26, 1918 |
| 2,313,974 | Smith | Mar. 16, 1943 |